United States Patent [19]

Morris, Jr.

[11] 4,305,288
[45] Dec. 15, 1981

[54] TEMPERATURE SENSING CIRCUIT

[75] Inventor: Harry J. Morris, Jr., Barneveld, N.Y.

[73] Assignee: General Electric Company, Utica, N.Y.

[21] Appl. No.: 115,329

[22] Filed: Jan. 25, 1980

[51] Int. Cl.[3] .......................................... G01K 7/00
[52] U.S. Cl. ............................................... 73/362 SC
[58] Field of Search ................. 73/362 SC; 307/310

[56] References Cited

U.S. PATENT DOCUMENTS 4,123,938 11/1978 Hamilton ................. 73/362 SC X
4,133,208 1/1979 Parlanti ........................ 73/362 SC

OTHER PUBLICATIONS

Three Part Article by J. Williams, "Designer's Guide to: Temperature Sensing" EDN, May 5, May 20 & Jun. 20, 1977.

Primary Examiner—James J. Gill
Attorney, Agent, or Firm—Ralph M. Savage; Stephen A. Young

[57] ABSTRACT

An improved temperature sensing circuit is disclosed comprising a power supply which forward biases a diode sensing element to control the gain of an operational amplifier. A temperature change causes the resistance of the diode to change, which changes its current flow. Since the anode of the diode is connected to the operational amplifier, the result is that the operational amplifier has a very linear output voltage proportional to temperature.

7 Claims, 2 Drawing Figures

TEMPERATURE SENSING CIRCUIT

FIELD OF THE INVENTION

This invention relates to temperature sensing circuits, and particularly to such temperature sensing circuits utilizing a diode sensor.

DESCRIPTION OF THE PRIOR ART

Conventional temperature sensing circuits utilize either a bridge network or a voltage divider network resulting in an output voltage of from 0–40 mV dc. There are a plurality of shortcomings associated with such prior art sensing circuits.

First, their output signals are so low that they require amplification which introduces gain instability, offset and calibration problems.

Second, conventional circuits require some type of power driver to drive controllers, recorders, meters, digital displays, A/D converters, etc.

Third, circuits incorporating a bridge network require a buffer stage to isolate the bridge network from the output driver.

Fourth, prior art circuits require precision resistors in the bridge network to obtain adequate linearity.

Fifth, transmission problems exist with remote sensing due to the low signal levels that conventional circuits operate with.

Accordingly, it is an object of the present invention to provide a temperature sensing circuit that can overcome the aforementioned shortcomings of the prior art. More specifically, it is an object to provide a circuit that has an output voltage in the range of 0 to approximately 14 volts, so as to overcome amplification and transmission difficulties and minimize gain and offset problems.

It is a further object to provide a circuit that can eliminate the necessity for power drivers, buffer stages, and precision resistors, and yet provide adequate linearity.

An additional object is to provide a low cost circuit that is small in size and weight, is composed of off the shelf components, and has high reliability.

BRIEF DESCRIPTION OF THE DRAWINGS

Various other objects, features and attendant advantages of the present invention will be more fully appreciated from the following detailed description when considered in connection with the accompanying drawings.

DESCRIPTION OF THE PREFERRED EMBODIMENT

Figure 1:
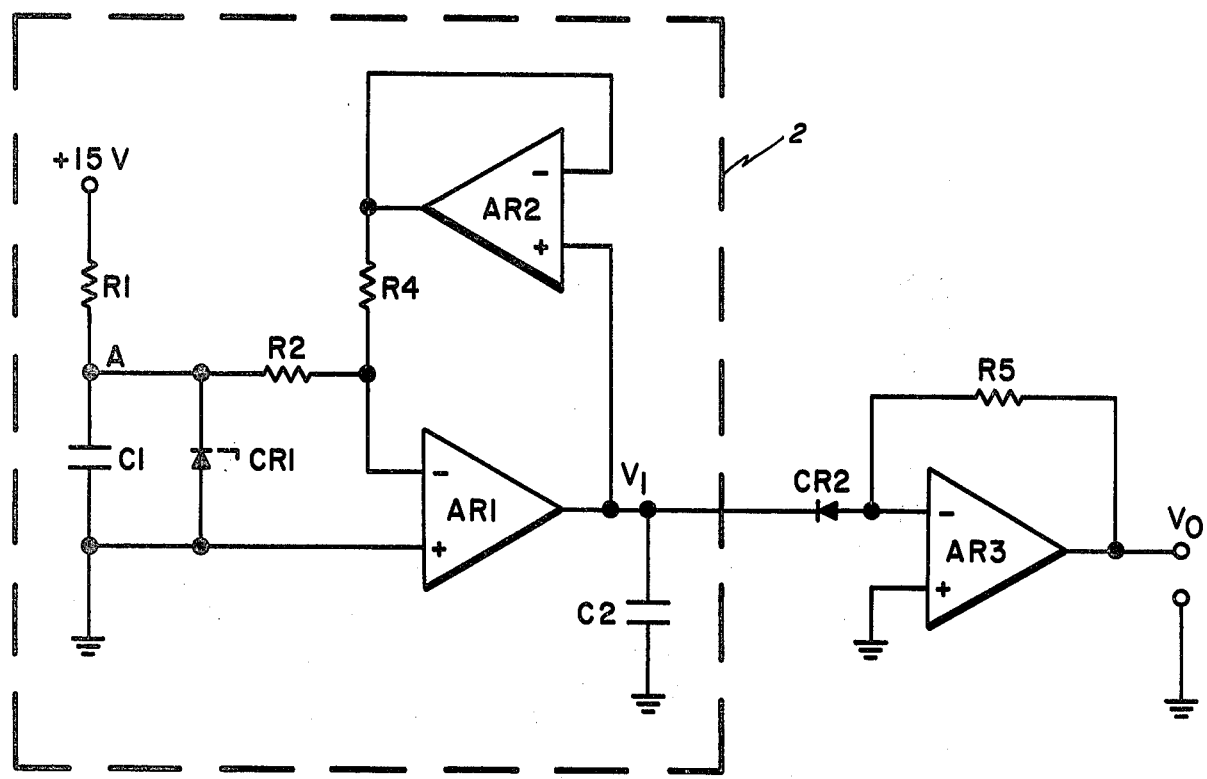
FIG. 1 is a schematic diagram of the temperature sensing circuit.

Referring now to the drawings, and more specifically to FIG. 1 thereof, there is shown generally the temperature sensing circuit which is the subject matter of the instant invention. Power supply 2 includes a voltage regulator diode, CR1, which provides a reference voltage of 6.2 volts at the input terminals of operational amplifier AR1. Series dropping resistor R1 has a value of 7.87 Kohms. Capacitor C1 is utilized to filter any unwanted signals that may be generated by zener diode CR1. Capacitor C2 filters any unwanted signals that may interfer with the sensing diode CR2.

Operational amplifier AR2, operates as an emitter follower that reduces the load on operational amplifier AR1, so that power supply 2 is more stable, thus assuring circuit stability. Since the input impedance of operational amplifier AR2 is very high, it enables operational amplifier AR1 to drive more of a load. Except when driving higher loads, the power supply works equally well when amplifier AR2 is replaced with a straight wire from the output of amplifier AR1 to resistor R4. The power supply output voltage, V1, is a function of the ratio of R4 to R2. If R2 were 10 Kohms and R4 were 1 Kohms, then the gain of operational amplifier AR1 would be 0.1 and the voltage at V1 would be $-0.62$ volts. This voltage will forward bias diode CR2, and since the voltage is less than the cutoff voltage (0.7 volts) for CR2, diode CR2 has some value of characteristic resistance, Rc.

The value of Rc changes as a function of temperature. As the temperature increases, the diode resistance, Rc, decreases, causing an increase in the gain of amplifier AR3. Similarly, as the temperature decreases, the diode resistance, Rc, increases, causing a decrease in the gain of amplifier AR3.

The resulting output voltage, Vo, is a linear function of temperature.

Conventional diode sensing circuits utilize constant current biasing techniques so that biasing is accomplished near the point of full conduction. Such circuits have the shortcoming that their point of voltage biasing changes with temperature which introduces non-linearities. The instant invention operates in the linear region of the characteristic diode curve at one specific point near cutoff. By utilizing a regulated voltage to establish and maintain a constant bias over the expected temperature range, such non-linearities are eliminated.

Figure 2:
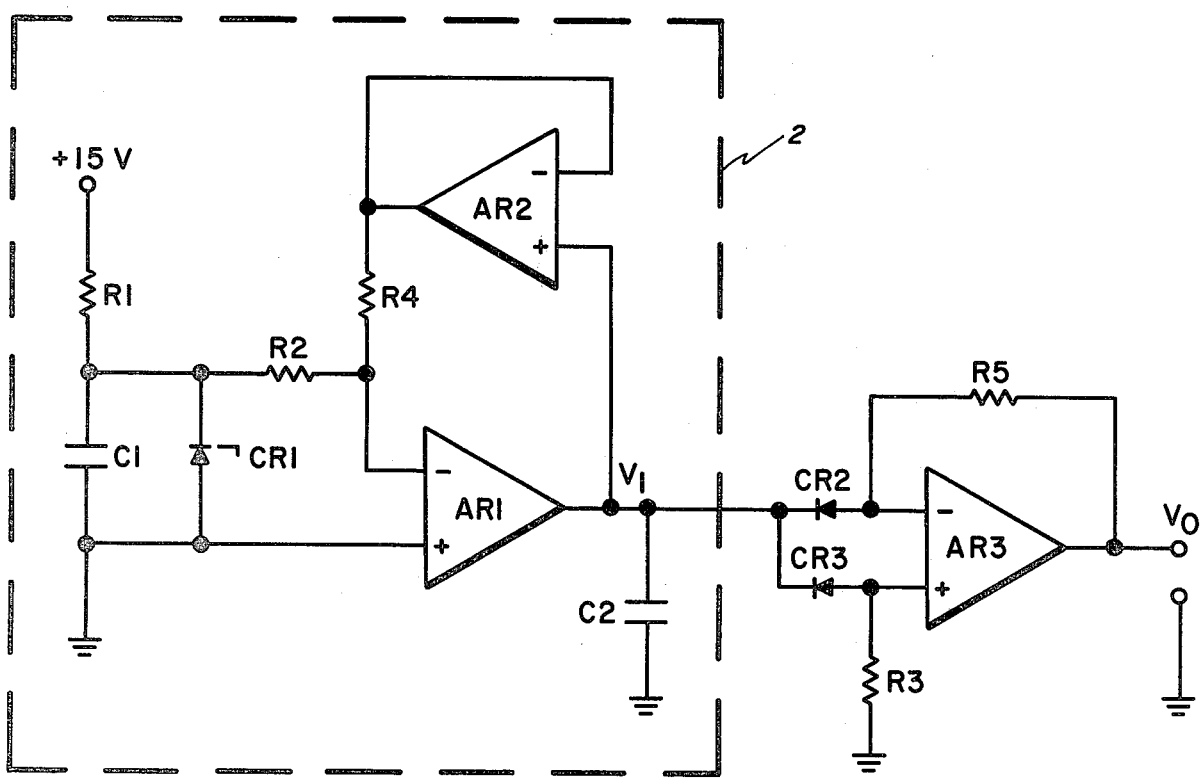
FIG. 2 is a schematic diagram of a temperature difference sensing circuit.

FIG. 2 includes a second sensing diode, CR3, identical to CR2, and a resistor R3 so as to comprise a temperature difference sensor. As in FIG. 1, CR1 provides a power supply reference. A change in temperature causes a change in current through CR2 and CR3. As long as the temperature change for CR2 and CR3 is the same, the output voltage, Vo, is zero volts. However, if the temperature at CR2 is higher than that at CR3, the output voltage, Vo, will be a proportional positive voltage. And correspondingly, if the temperature at CR2 is lower than that at CR3, the output voltage, Vo, will be a proportional negative voltage. That is the output voltage varies proportionally to the temperature difference.

The circuit shown in FIG. 2 has a temperature sensitivity greater than 300 mV/°C. In either direction, sensitivity varies directly with the identical values of resistors R3 and R5. As the values of resistors R3 and R5 increases, the temperature difference sensitivity will also increase.

Operational amplifiers AR1, AR2 and AR3 are 3 of the four operational amplifiers in National Semiconductor Corporation's LM-148. CR1, CR2 and CR3 can be realized by National Semiconductor's 1N821, 1N914 and 1N914, respectively. Typical values for the resistors and capacitors are shown in Table 1.

TABLE 1

| COMPONENT | VALUE |
|---|---|
| R1 | 7870 ohms |
| R2 | 10,000 ohms |
| R3 | 10,000 ohms |
| R4 | 1,000 ohms |
| R5 | 10,000 ohms |
| C1 | .1 microfarads at 50 volts |

TABLE 1-continued

| COMPONENT | VALUE |
| --- | --- |
| C2 | .1 microfarads at 50 volts |

While a preferred embodiment of the invention has been shown and described, various other embodiments and modifications thereof will become apparent to persons skilled in the art, and will fall within the scope of invention as defined in the following claims.

Having thus described the invention, what is claimed as new and desired to be secured by Letters Patent of the United States is:

1. A temperature sensing circuit comprising:
    (a) a power supply producing a stable output voltage;
    (b) a temperature sensing element comprised of a diode, said diode having a first end and a second end, said first end being connected to said output voltage of said power supply to forward bias said diode in the linear region of its characteristic curve at one specific point near cutoff to establish a given characteristic resistance for a given temperature, which characteristic resistance varies inversely with changes in temperature; and
    (c) a current to voltage transducer having at least one input terminal and an output terminal, one of said input terminals being connected to said second end of said temperature sensing element, whereby a voltage appearing at said output terminal is proportional to the temperature which is to be determined by said circuit and sensed by said diode.

2. The invention of claim 1 wherein said current to voltage transducer further comprises:
    (a) an amplifying means having a first and a second input terminal and an output terminal, said first input terminal being connected to said second end of said temperature sensing element, said second input terminal being connected to a ground potential; and
    (b) a first resistor having a first end and a second end, said first end being connected to said first input terminal of said amplifying means, and said second end being connected to said output terminal of said amplifying means.

3. A temperature difference sensing circuit comprising:
    (a) a power supply producing a stable output voltage;
    (b) a first temperature sensing element having a first end and a second end, said first end being connected to said output voltage of said power supply;
    (c) a second temperature sensing element having a first end and a second end, said first end being connected to said output voltage of said power supply;
    (d) a current to voltage transducer having a first input terminal, a second input terminal and an output terminal, said first input terminal being connected to said second end of said first temperature sensing element, said second input terminal being connected to said second end of said second temperature sensing element, and said output terminal having a voltage proportional to the difference in temperature between said first and said second sensing elements; and
    (e) a first resistor having a first end and a second end, said first end being connected to said second end of said second temperature sensing element and said second end being connected to a ground potential.

4. The invention of claim 3, wherein said supply being connected to an input reference voltage further comprises:
    (a) a second resistor having a first and second end, said first end being connected to said input reference voltage;
    (b) a regulating diode having its cathode end being connected to said second end of said second resistor, and having its anode end being connected to a ground potential;
    (c) a third resistor having a first and a second end, said first end being connected to said second end of said second resistor;
    (d) a first amplifying means having two input terminals and an output terminal, said first input terminal being connected to said second end of said third resistor, and said second input terminal being connected to said anode of said regulating diode;
    (e) a first capacitor having a first end and a second end, said first end being connected to said end of said second resistor, and having said second end connected to a ground potential;
    (f) a feedback loop having a first end and a second end, said first end being connected to said second end of said third resistor and having said second end being connected to said output terminal of said first amplifying means; and
    (g) a second capacitor having a first and a second end, said first end being connected to said output terminal of said first amplifying means.

5. The invention of claim 3 wherein said power supply being connected to an input reference voltage further comprises:
    (a) a second resistor having a first and second end, said first end being connected to said input reference voltage;
    (b) a regulating diode having its cathode end being connected to said second end of said second resistor, and having its anode end being connected to a ground potential;
    (c) a third resistor having a first and a second end, said first end being connected to said second end of said second resistor;
    (d) a first amplifying means having two input terminals and an output terminal, said first input terminal being connected to said second end of said third resistor, and said second input terminal being connected to said anode of said regulating diode;
    (e) a first capacitor having a first end and a second end, said first end being connected to said second end of said second resistor, and having said second end connected to a ground potential;
    (f) a feedback loop comprising:
        (i) a fourth resistor having a first end and a second end, said first end being connected to said second end of said third resistor;
        (ii) a second amplifying means having two input terminals and an output terminal, said first input terminal being connected to its output terminal, said second input terminal being connected to said output terminal of said first amplifying means, and said output terminal being connected to said second end of said fourth resistor; and
    (g) a second capacitor having a first and a second end, said first end being connected to said output terminal of said first amplifying means.

6. The invention of claim 3 wherein said power supply being connected to an input reference voltage further comprises:
   (a) a second resistor having a first and second end, said first end being connected to said input reference voltage;
   (b) a regulating diode having its cathode end being connected to said second end of said second resistor, and having its anode end being connected to a ground potential;
   (c) a third resistor having a first and a second end, said first end being connected to said second end of said second resistor;
   (d) a first amplifying means having two input terminals and an output terminal, said first input terminal being connected to said second end of said third resistor, and said second input terminal being connected to said anode of said regulating diode;
   (e) a first capacitor having a first end and a second end, said first end being connected to said second end of said second resistor, and having said second end connected to a ground potential;
   (f) a feedback loop comprising a fourth resistor having a first end and a second end, said first end being connected to said second end of said third resistor, and said second end being connected to said output terminal of said first amplifying means; and
   (g) a second capacitor having a first and a second end, said first end being connected to said output terminal of said first amplifying means.

7. The invention of claim 3, wherein said current to voltage transducer further comprises:
   (a) an amplifying means having a first and a second input terminal and an output terminal, said first input terminal being connected to said second end of said first temperature sensing element, and said second input terminal being connected to said second end of said second temperature sensing element; and
   (b) a second resistor having a first end and a second end, said first end being connected to said first input terminal of said amplifying means, and said second end being connected to said output terminal of said amplifying means.

* * * * *